United States Patent
Emiljanow

(10) Patent No.: US 8,022,330 B2
(45) Date of Patent: Sep. 20, 2011

(54) METHOD AND DEVICE FOR WELDING STRUCTURAL COMPONENTS

(75) Inventor: Klaus Emiljanow, Sehnde (DE)

(73) Assignee: MTU Aero Engines GmbH, Munich (DE)

( * ) Notice: Subject to any disclaimer, the term of this patent is extended or adjusted under 35 U.S.C. 154(b) by 1528 days.

(21) Appl. No.: 10/570,958

(22) PCT Filed: Aug. 31, 2004

(86) PCT No.: PCT/DE2004/001921
§ 371 (c)(1),
(2), (4) Date: Mar. 7, 2006

(87) PCT Pub. No.: WO2005/030429
PCT Pub. Date: Apr. 7, 2005

(65) Prior Publication Data
US 2007/0023403 A1    Feb. 1, 2007

(30) Foreign Application Priority Data
Sep. 24, 2003  (DE) .................. 103 44 225

(51) Int. Cl.
*B23K 26/00* (2006.01)
*B23K 26/12* (2006.01)
(52) U.S. Cl. ......... 219/121.64; 219/121.63; 219/121.86
(58) Field of Classification Search ............. 219/121.63, 219/121.64, 121.86
See application file for complete search history.

(56) References Cited

U.S. PATENT DOCUMENTS

| | | | |
|---|---|---|---|
| 4,549,058 A | 10/1985 | DelMaestro et al. | 219/121 |
| 4,574,180 A * | 3/1986 | Kasner et al. | 219/121.82 |
| 5,160,822 A | 11/1992 | Aleshin | 219/121.64 |
| 5,479,704 A | 1/1996 | Richter et al. | 29/889.1 |
| 5,554,837 A | 9/1996 | Goodwater et al. | 219/121.63 |
| 5,889,254 A * | 3/1999 | Jones | 219/121.63 |
| 6,593,540 B1 * | 7/2003 | Baker et al. | 219/121.63 |
| 6,727,459 B1 * | 4/2004 | Bialach | 219/121.64 |
| 2004/0202886 A1 * | 10/2004 | Subramanian | 428/632 |

FOREIGN PATENT DOCUMENTS

| | | |
|---|---|---|
| DE | 43 27 189 | 2/1995 |
| DE | 196 30 703 | 2/1998 |
| DE | 100 05 874 | 8/2001 |
| EP | 0 740 976 B1 | 11/2001 |
| GB | 2 315 697 | 2/1998 |
| JP | 9-110596 | 4/1997 |
| JP | 9-506039 | 6/1997 |
| JP | 2001-269784 | 10/2001 |

OTHER PUBLICATIONS

MCrAlY.pdf.*

* cited by examiner

*Primary Examiner* — Ket Dang
(74) *Attorney, Agent, or Firm* — Davidson, Davidson & Kappel, LLC

(57) ABSTRACT

A method and device are provided for welding structural parts, preferably of a gas turbine, especially of an aircraft engine. A structural component is laser-welded by means of at least one laser source, the one or more laser sources being operated in a pulsed mode. Pulse duration and/or pulse shape and/or output of the one or more laser sources are adjusted in a variable manner. The wire advance of the welding wire is controlled subject to the pulses of the one or more laser sources.

14 Claims, 1 Drawing Sheet

METHOD AND DEVICE FOR WELDING STRUCTURAL COMPONENTS

FIELD OF THE INVENTION

The present invention relates to a method for welding structural components, preferably of a gas turbine, in particular of an aircraft engine. The present invention also relates to a device for welding structural components, preferably of a gas turbine, in particular of an aircraft engine.

BACKGROUND

Gas turbines, in particular aircraft engines, must meet exceedingly stringent requirements in terms of reliability, weight, performance, economy and service life. In recent decades, aircraft engines have been developed, particularly for use in the civil sector, which have fully satisfied the above requirements and have attained a high level of technical perfection. The selection of material, the search for new types of suitable material, as well as the quest for novel manufacturing processes have played a decisive role in aircraft engine development. Since gas turbines are subject to high stresses and, therefore, defective regions may form on the gas turbine during operation, it is also crucial that highly developed repair processes be devised, to enable the defective regions to be repaired reliably, safely, quickly and cost-effectively.

The most important materials employed today for aircraft engines or other types of gas turbines are titanium alloys, nickel alloys (also called superalloys) and high-strength steels. The high-strength steels are used for shaft parts, gear parts, for the compressor housing and the turbine housing. Titanium alloys are typical materials used for compressor parts, in particular for compressor blades. Nickel alloys are suited for the heat-exposed parts of the aircraft engine, thus, for example, for the turbine blades. The latest generation of gas turbine components is manfactured from directionally solidified or monocrystalline materials, besides being weight-optimized, the components also being structurally designed to have ever thinner wall thicknesses.

The tendencies described above in the development of gas turbine components, namely the search for increasingly improved materials, and the increasingly weight-optimized structural components, place very high demands on the manufacturing processes, as well as on the repair processes, which also include welding processes.

However, highly heat-resistant superalloys, which, namely, may be present as directionally solidified materials and as monocrystalline materials, exhibit a high susceptibility to cracking and to distortion during welding processes. Accordingly, structural components made of the above materials are only workable or repairable to a less than satisfactory extent using conventional welding methods.

The German Patent No. DE 43 27 189 C2 describes a repair welding method for the blades of gas turbines. The method it discusses provides for a butt welding of a previously prepared repair surface, either plasma arc welding (PAW), laser-beam welding or electron beam welding being used as the butt welding method. In this case, a $CO_2$ laser is used as a laser source.

The German Patent No. DE 196 30 703 C2 describes a method and a device for the repair welding of structural components manufactured from a nickel-based alloy. In the repair welding method according to German Patent No. DE 196 30 703 C2, the structural component to be welded is inductively heated, either tungsten-inert-gas welding (TIG) or plasma arc welding being used as the welding method.

SUMMARY OF THE INVENTION

The disadvantage associated with all of the related art welding methods, in particular repair welding methods, is that relatively high levels of heat are introduced into the structural component to be welded during the welding process. It holds especially for thin-walled components made of superalloys, in particular for directionally solidified or monocrystalline materials, that the high levels of heat introduced into the structural component can lead to a penetration defect, localized collapsing of the molten weld pool, distortion on the structural component, or to new or expanded crack formations. Excessive weld sagging can arise when working with double-walled components. Accordingly, the welding methods known from the related art require substantial outlay for postprocessing. Moreover, there are considerable fluctuations in the quality obtained using the welding methods according to the related art.

Against this background, an object of the present invention is to devise a novel method, as well as a novel device for welding structural components, preferably of a gas turbine.

In accordance with the present invention, the or each laser source is operated in pulsed mode. In the welding method according to the present invention, heat is introduced into the structural component to be welded selectively and at very minimal levels. The energy introduced into the structural component to be welded and thus the heat input introduced are precisely controllable. The method according to the present invention makes it possible to produce very thin and reproducible weld seams, even when working with structural components made of superalloys, in particular of directionally solidified or monocrystalline materials, and when welding thin-walled components. The welding quality is improved and any reworking necessitated by recurring cracks, penetration defects, component distortion and the like is reduced to a minimum. The welding method according to the present invention may be effectively implemented without preheating the structural components to be welded.

One advantageous aspect of the present invention provides for a welding wire to be automatically advanced into the area of the laser beam of the or of each laser source, a control device determining a wire feed rate of the welding wire as a function of the pulse duration and/or pulse shape and/or power output of the or of each laser source and, respectively, of the corresponding laser beam.

The laser welding of the structural component is preferably carried out in an unpreheated state of the structural component under an inert gas atmosphere.

The device according to the present invention is preferably constituted as a handheld laser device. The method according to the present invention, as well as the device according to the present invention are preferably used for welding structural components made of a directionally solidified or of a monocrystalline material.

BRIEF DESCRIPTION OF THE DRAWINGS

The present invention is described in greater detail in the following on the basis of exemplary embodiments, without being limited thereto. Reference is made to the drawing, whose.

DETAILED DESCRIPTION

Figure 1:
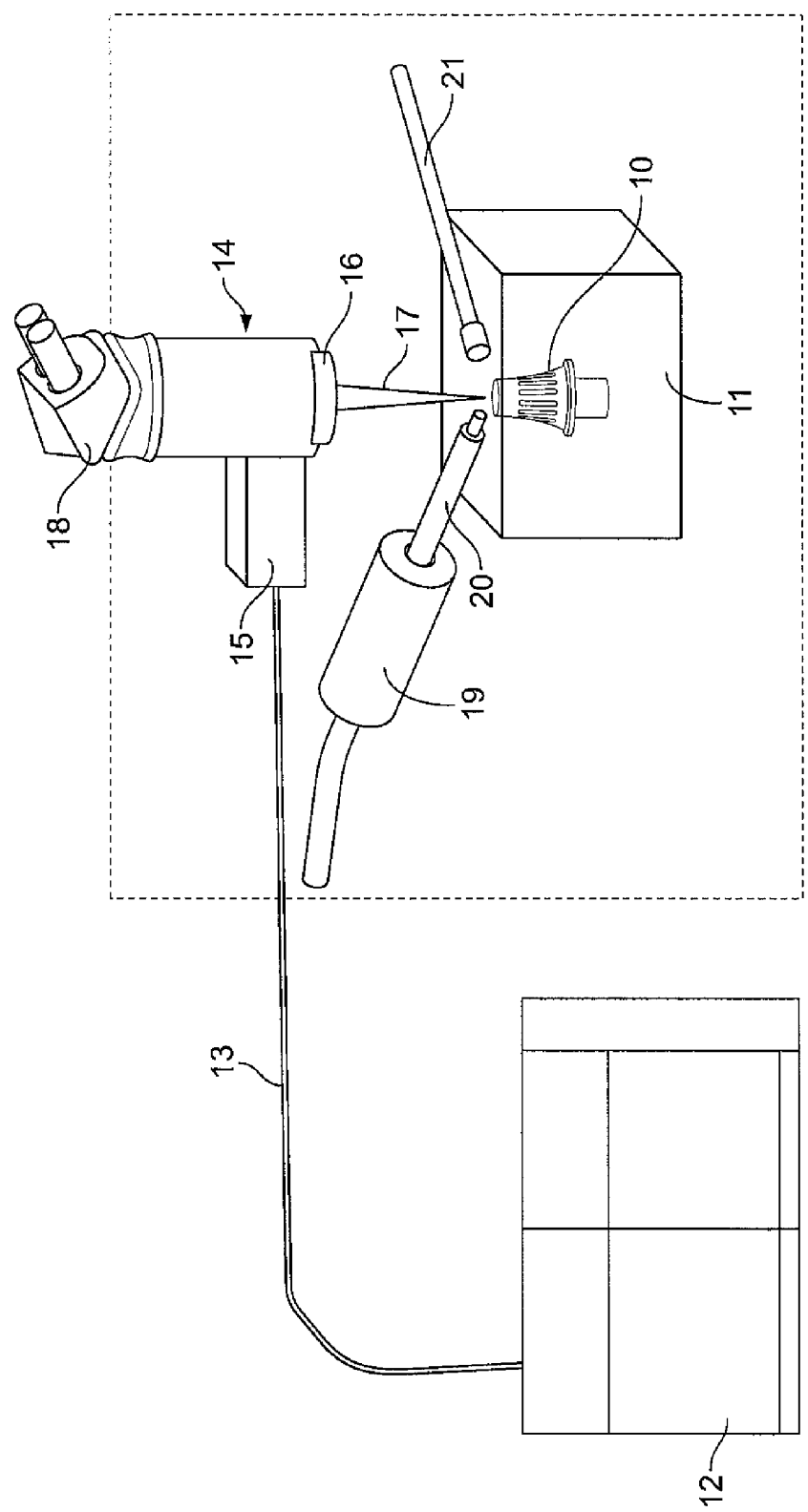
FIG. 1 shows a schematized representation of a device according to the present invention for implementing the method according to the present invention.

The method and the device according to the present invention for the welding, in particular the repair welding of structural components, preferably of a gas turbine, are clarified in greater detail in the following. FIG. 1 shows one preferred exemplary embodiment of a device according to the present invention for welding gas turbine components, the device being designed as a handheld laser device.

In the exemplary embodiment of FIG. 1, a structural component 10 to be welded is placed in a welding receptacle or holding receptacle 11. In the illustrated exemplary embodiment, structural component 10 is in the form of a gas turbine blade.

Laser welding is used to weld structural component 10 in holding receptacle 11. The device according to FIG. 1 includes a laser source 12, the laser light produced by laser source 12 being conducted via an optical fiber 13 into the area of a processing station 14. Processing station 14 includes optical elements 15, 16 in order to focus the laser light produced by laser source 12 and to deliver it as a precisely directed and aimed laser beam 17 to structural component 10 to be welded. The welding process may be monitored or observed using a stereomicroscope 18 assigned to processing station 14.

Along the lines of the present invention, laser source 12 is operated in the so-called pulsed mode. Accordingly, the laser welding is carried out in a pulsed mode, a pulsating laser beam 17 being used to weld the structural component. In this connection, the pulse duration and/or pulse shape and/or power of laser beam 17 or of laser source 12 are variably settable. Welding may be carried out both in continuous-pulse operation as well as in single-pulse operation. The pulse shape, pulse duration, and the power of laser beam 17 are preferably controlled by a control device (not shown). This permits a very selective directing or focusing of laser beam 17 at structural component 10, with the result that the energy introduced by laser beam 17 is precisely controllable. The heat input during the welding process using the pulsed method is very low, obviating the need for an oversized molten weld pool. By employing the pulsed laser welding method, any deformation, parts distortion, microstructural changes and cracking on structural component 10 to be welded are reduced to a minimum.

The pulsed-operation laser welding method according to the present invention may be applied very advantageously to thin-walled components made of superalloys existing in directionally solidified or monocrystalline form. These structural components are, in particular, gas turbine blades. Structural components of this kind are particularly sensitive during welding processes and, by employing the method according to the present invention, are able to be welded without being preheated, i.e., in the unpreheated state. As a result, gas turbine blades are able to be repaired very reliably, safely, quickly and cost-effectively. The pulsed laser welding method according to the present invention makes it possible for worn edges of gas turbine blades to be rewelded while achieving exceptionally high contour accuracy, and for cracks in the turbine blades to be reliably closed.

The device according to the present invention also includes a wire feeder 19. Wire feeder 19 advances a welding wire 20 into contact with structural component 10 to be welded. In accordance with the present invention, wire feeder 19 is controlled by the control device (not shown) in such a way that a wire feed rate of welding wire 20 is adapted to the pulse duration and/or pulse shape and/or power output of the pulsed laser welding method. The wire feed rate is controlled in such a way that welding wire 20 is precisely fed per welding pulse, into contact with structural component 10 to be welded. In the process, the wire feed rate is preferably set as a function of the laser power. Using empirically ascertained welding parameters, which are stored in a database of the control device (not shown), the requisite welding parameters may be retrieved as a function of the particular damage. To enhance process reliability, the present invention provides for a CNC machine that is driven by the control device (not shown) to be used for feeding welding wire 20.

Structural component 10 to be repaired is welded in holding receptacle 11, preferably shielded by an inert gas atmosphere. An inert gas is introduced via an inert gas feed line 21 into holding receptacle 11. A suitable inert gas is selected by one skilled in the art whom this technical teaching concerns, in dependence upon the materials of the structural components to be welded.

A solid state laser, preferably an Nd-YAG solid state laser, is used as laser source 12. This solid state laser is operated in pulsed mode and is controllable by a control device. A pulsed solid state laser is preferably used, whose average laser power output is within the range from 100 W to 500 W, the peak pulse power being between at least 6 to 10 kW. The pulse power fluctuates between 0.1 to 80 J, and the pulse duration is variably settable between 0.1 and 30 ms. The solid-state laser is optically excited; it is preferably designed as a diode-pumped or lamp-pumped solid-state laser.

The device according to the present invention as illustrated in FIG. 1 is designed as a stationary handheld welder and, accordingly, as a handheld laser unit. Thus, in the described preferred exemplary embodiment, in which a control device controls the pulse duration, pulse shape and power of laser beam 17, as well as the wire feed for welding wire 20, an operator merely needs to guide structural component 10 to be welded, underneath laser beam 17, and observe the quality of the welding operation through stereomicroscope 18. In rigid or linear applications, a triaxial system may optionally be used for feeding the structural component. Besides a motor driven, controlled wire feed for welding wire 20, it is self-evident that a manual wire feed operation is possible as well. However, the motor driven, controlled wire feed is more precise and thus preferred.

The above described specific embodiment of the device according to the present invention as a stationary handheld welder is primarily suited for processing, namely for welding or repair welding relatively small gas turbine components, such as gas turbine blades. To process larger structural components or to perform welding operations directly on the gas turbine, the device according to the present invention may also be realized as a mobile welding device. A specific embodiment of this kind makes it possible for large-volume, heavy, and hard-to-reach structural components to be processed as well. In such a case, processing station 14 is mounted on an articulated arm that is movable into the area of the structural component to be welded. It is also conceivable for processing station 14 to be advanced by a multiaxis gantry-type system to the structural component to be processed. In this case, the device according to the present invention is designed as a gantry-type system.

The method according to the present invention, as well as the device according to the present invention are preferably used for the welding, in particular repair welding of structural components of high-temperature-resistant superalloys having a directionally solidified or monocrystalline form. By employing the novel method, structural components of gas turbines, such as axially symmetrical components, for example seals and retaining rings, may be welded. In addition to housing parts, rotor blades, as well as guide vanes of high-pressure turbines, low-pressure turbines and compressors may be welded. All superalloy γ'-phase materials, materials from the MCrAlY family, and all high-temperature alloys, as well as alloys from the nickel group or cobalt group are able to be reliably welded. Examples of materials that are weldable using the method according to the present invention, include: R'80, R'41, DSR'142, R'N5, R'N4, PWA 1426, PWA 1484, PWA 1480, MARM 509 or also MARM 274. As a welding wire, primarily one is used having the same composition as the structural component to be welded.

By employing the present invention, a multiplicity of advantages are attainable over the related art. Thus, cracking is reduced during the welding operation and subsequently thereto. In addition, there is less distortion on the structural components due to the narrower heat-affected zone and the decreased heat input. Higher strengths, as well as more finely grained weld metal may be obtained during welding, which is consistent with improved quality of the welding process. A reliable repair welding of even extremely thin-walled structural components is possible. The device according to the present invention is very versatile. On the one hand, it may be used to weld small structural components and, on the other hand, large, heavy, and not easily accessible structural components, as well. A reproducible welding quality is derived from the laser pulse control and from the wire feed control. A durable and wear-resistant weld joint is able to be produced by employing the method according to the present invention. Because the composition of the structural component to be welded and that of the welding wire used as filler metal are of like kind, the weld joint formed achieves virtually the same properties as the base material and is thus less susceptible in later operation, in particular to thermal fatigue cracking, since it has the same thermal expansion coefficient as the base material.

What is claimed is:

1. A method for welding structural components of a gas turbine, comprising
    operating a laser source in a pulsed mode to laser-weld a structural component of a gas turbine while the structural component is in a holding receptacle filled with inert gas; and
    automatically advancing a welding wire into an area of the laser beam of the laser source, said step of automatically advancing further including controlling a wire feed rate of the welding wire as a function of a plurality of pulse durations, pulse shapes, and power outputs of the laser beam from the laser source.

2. The method as recited in claim 1, wherein the step of operating the laser source further comprises:
    setting one or more of a variably settable pulse duration and a variably settable laser power of the laser source, and
    welding the structural component in response to pulses of a laser beam of the laser source.

3. The method as recited in claim 1, wherein the laser welding of the structural component is performed without preheating the structural component.

4. The method as recited in claim 1, wherein said step of automatically advancing further comprises advancing the welding wire in response to each pulse of the laser from the laser source, and wherein a feed rate of the welding wire is a function of the power output of the laser source.

5. The method as recited in claim 1, wherein the laser source includes a plurality of laser sources.

6. A method for welding structural components of a gas turbine, comprising:
    providing a structural component of a gas turbine comprised of a directionally solidified material or a monocrystalline material;
    operating a laser source in a pulsed mode to laser-weld the structural component while the structural component is in a holding receptacle filled with inert gas; and
    automatically advancing a welding wire into an area of the laser beam of the laser source, said step of automatically advancing further including controlling a wire feed rate of the welding wire as a function of a plurality of pulse durations, pulse shapes, and power outputs of the laser beam from the laser source.

7. A method for welding structural components of a gas turbine, comprising:
    providing a structural component of a gas turbine comprised of a nickel-based alloy or of a cobalt-based alloy;
    operating a laser source in a pulsed mode to laser-weld the structural component while the structural component is in a holding receptacle filled with inert gas; and
    automatically advancing a welding wire into an area of the laser beam of the laser source, said step of automatically advancing further including controlling a wire feed rate of the welding wire as a function of a plurality of pulse durations, pulse shapes, and power outputs of the laser beam from the laser source.

8. The method of claim 7, wherein the structural component comprises an MCrAlY material.

9. A device for welding structural components of a gas turbine, comprising
    a hand-held laser device, the hand-held device including:
        at least one laser source; and
        a controller, the controller controlling an output of the laser source to produce a pulsed laser beam, wherein a function of plurality of pulse durations, pulse shapes, and laser power outputs are variably settable via the controller;
    a holding receptacle having an inert gas feed line; and
    a wire feeder coupled to, and controllable by, the controller, the wire feeder advancing a welding wire automatically into a area of the laser beam of the laser source,
wherein the controller is configured to control the wire feeder such that a wire feed rate of the welding wire is dependent on the plurality of the pulse durations, the pulse shapes, and the power outputs of the laser source.

10. The device as recited in claims 9, wherein the laser source is a solid-state laser.

11. The device as recited in claim 10, wherein the solid-state laser is an Nd-YAG solid state laser.

12. The device as recited in claim 10, wherein the solid-state laser is an optically excited solid-state laser.

13. The device as recited in claim 12, wherein the optically excited solid-state laser is one of a diode-pumped solid-state laser and a lamp-pumped solid-state laser.

14. The device as recited in claim 9, wherein the laser source includes a plurality of laser sources.

* * * * *